United States Patent
Byman et al.

(10) Patent No.: US 12,134,738 B2
(45) Date of Patent: *Nov. 5, 2024

(54) METHOD FOR PRODUCING RENEWABLE HYDROCARBONS

(71) Applicant: Neste Oyj, Espoo (FI)

(72) Inventors: Olli Byman, Porvoo (FI); Annika Malm, Porvoo (FI); Ronny Wahlström, Porvoo (FI); Tuula Lehtimaa, Porvoo (FI); Hemanathan Kumar, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,196

(22) Filed: Apr. 7, 2023

(65) Prior Publication Data

US 2023/0323214 A1    Oct. 12, 2023

(30) Foreign Application Priority Data

Apr. 7, 2022 (FI) ..................................... 20225301

(51) Int. Cl.
    *C10G 3/00*    (2006.01)
(52) U.S. Cl.
    CPC .................. *C10G 3/40* (2013.01); *C10G 3/42* (2013.01); *C10G 3/50* (2013.01); *C10G 3/60* (2013.01);
(Continued)
(58) Field of Classification Search
    CPC ... C10G 3/40; C10G 3/42; C10G 3/50; C10G 3/60; C10G 2300/1014; C10G 2300/1018;
(Continued)

(56) References Cited

FOREIGN PATENT DOCUMENTS

| EP | 0 574 272 | 12/1993 |
| EP | 2 578 673 | 4/2013 |

(Continued)

OTHER PUBLICATIONS

Search Report for FI Application No. 20225301 dated Aug. 23, 2022, 2 pages.

*Primary Examiner* — In Suk C Bullock
*Assistant Examiner* — Jason Y Chong
(74) *Attorney, Agent, or Firm* — Joshua B. Brady; Nixon & Vanderhye, P.C.

(57) ABSTRACT

The present invention relates to a method for producing renewable hydrocarbons from an oxygen containing renewable feedstock, the feedstock comprising dissolved impurities selected from impurities comprising phosphorus and impurities comprising at least one metal, the feedstock further comprising at least one of triglycerides and free fatty acids. The method comprises obtaining a net elementary charge based on phosphorus and the at least one metal of a first feedstock; mixing the first feedstock with an elementary charge balancing component to obtain the feedstock to be purified, which feedstock to be purified has a net elementary charge within a range of from −5 to 15 mmol elementary charge/kg of the feedstock to be purified; subjecting the feedstock to be purified to heat treatment at a temperature of 180-400° C. in order to precipitate compounds containing said phosphorus and said at least one metal; removing formed precipitate compounds comprising said at least one metal and said phosphorus to obtain a purified feedstock; and subjecting the purified feedstock to a hydrotreatment using a catalyst sensitive to at least one of said impurities.

26 Claims, 1 Drawing Sheet

(52) U.S. Cl.
CPC ............... *C10G 2300/1014* (2013.01); *C10G 2300/1018* (2013.01); *C10G 2300/202* (2013.01); *C10G 2300/205* (2013.01); *C10G 2300/4006* (2013.01)

(58) Field of Classification Search
CPC ........ C10G 2300/202; C10G 2300/205; C10G 2300/4006; C10G 45/72; Y02P 30/20
See application file for complete search history.

(56) References Cited

FOREIGN PATENT DOCUMENTS

| | | |
|---|---|---|
| GB | 2 580 221 A | 7/2020 |
| WO | 2009/158268 | 12/2009 |
| WO | WO 2018/024728 A1 | 2/2018 |
| WO | 2020/016410 | 1/2020 |
| WO | WO 2020/016400 A1 | 1/2020 |
| WO | WO 2020/136034 A1 | 7/2020 |

METHOD FOR PRODUCING RENEWABLE HYDROCARBONS

CROSS-REFERENCE TO RELATED APPLICATIONS

This application claims priority to FI Patent Application No. 20225301 filed Apr. 7, 2022, the entire contents of which are hereby incorporated by reference.

FIELD

The present invention relates to a method for producing renewable hydrocarbons from a renewable feedstock.

BACKGROUND AND OBJECTS

In view of climate change and reducing natural resources of for example fossil oil, there exists a need to re-use various feedstocks, for example in the production of plastics or fuels, and other chemical industries. A source of feedstock for such uses is used oils as well as side streams and wastes from the food industry. The quality and content of such feedstocks however varies greatly, even from the same source, from one batch to another, and the sources are typically such that one particular source is not industrially usable on its own. Indeed, these kinds of feedstocks contain various impurities, which cause problems in their processing, especially in their hydrotreatment. Typically, such feedstocks contain different types of impurities than feedstocks of fossil origin.

Some particularly challenging impurities are phosphorus and metals, especially for feedstocks which are intended for hydrotreatment. These can be partly removed from the feedstock by bleaching or heat treatment or both, but the removal of especially phosphorus is not efficient enough. For some feedstocks, it is also not possible to remove metals efficiently, and the high content of metals may even lead to problems in the purification process.

There exists thus a need for providing an efficient way of producing renewable hydrocarbons from renewable feedstocks. It is therefore an aim to provide a method that includes purifying a renewable feedstock from impurities that cause problems in hydrotreatment. Another aim is to provide a method for purifying renewable feedstocks to a degree of purity sufficient for further hydrotreatment of the feed.

SUMMARY OF THE INVENTION

The invention is defined by the features of the independent claims. Some specific embodiments are defined in the dependent claims. According to one aspect, there is provided a method for producing renewable hydrocarbons from an oxygen containing renewable feedstock, the feedstock comprising dissolved impurities selected from impurities comprising phosphorus and impurities comprising at least one metal, the feedstock further comprising at least one of triglycerides and free fatty acids, the method comprising
a) obtaining a net elementary charge Q1 based on phosphorus and the at least one metal in a first feedstock;
b) mixing the first feedstock with an elementary charge balancing component to obtain the feedstock to be purified, which feedstock to be purified has a net elementary charge Qt based on phosphorus and the at least one metal within a range of from −5 to 15 mmol elementary charge/kg of the feedstock to be purified;
c) subjecting the feedstock to be purified to heat treatment at a temperature of 180-400° C., in order to precipitate compounds containing said phosphorus and said at least one metal;
d) removing the formed precipitate compounds comprising said at least one metal and said phosphorus, to obtain a purified feedstock; and
e) subjecting the purified feedstock to a hydrotreatment using a catalyst sensitive to at least one of said impurities.

DETAILED DESCRIPTION

In the present description, weight percentages (wt-%) are calculated on the total weight of the material in question (typically a blend or a mixture). Volume percentages (vol-%) are also calculated on the total volume of the material in question (typically also a blend or a mixture). Any amounts defined as ppm (parts per million), are based on weight.

The term "renewable" in the context of a renewable fuel component refers to one or more organic compounds derived from any renewable source (i.e., not from any fossil-based source). Thus, the renewable fuel component is based on renewable sources and consequently does not originate from or is derived from any fossil-based material. By the term fuel, it is understood both fuels usable as such as well as fuel components, which fulfil the requirements of standards for the respective use. For example, within EU, the standard for gasoline is EN 228 (2017), for regular diesel EN 590 (2017) and for paraffinic diesel EN 15940 (2019), and for regular aviation fuel D1655 (2020), and aviation turbine fuel containing synthesized hydrocarbons D7566 (2020).

The $^{14}C$-isotope content can be used as evidence of the renewable or biological origin of a feedstock or product. Carbon atoms of renewable material comprise a higher number of unstable radiocarbon ($^{14}C$) atoms compared to carbon atoms of fossil origin. Therefore, it is possible to distinguish between carbon compounds derived from biological sources, and carbon compounds derived from fossil sources by analysing the ratio of $^{12}C$ and $^{14}C$ isotopes. Thus, a particular ratio of said isotopes can be used to identify and quantify renewable carbon compounds and differentiate those from non-renewable i.e. fossil carbon compounds. The isotope ratio does not change in the course of chemical reactions. Example of a suitable method for analysing the content of carbon from biological sources is ASTM D6866-20 (2020). An example of how to apply ASTM D6866-20 to determine the renewable content in fuels is provided in the article of Dijs et al., Radiocarbon, 48(3), 2006, pp 315-323. For the purpose of the present invention, a carbon-containing material, such as a feedstock or product is considered to be of renewable origin if it contains 90% or more modern carbon (pMC), such as about 100% modern carbon, as measured using ASTM D6866-20.

In this description, when "feedstock" is discussed, both the first and optional second feedstocks (and possible further feedstocks) are meant, unless otherwise specified. The terms "net elementary charge" and "elementary charge" can be used interchangeably, as can the terms "elementary charge balancing component" and "balancing component". Moreover, when "net elementary charge Q" or "net elementary charge" is mentioned and a formula is given for its calculation, the same formula is used for all net elementary charges, and the unit is mmol elementary charge/kg of feedstock. The elementary charge, also denoted by e is the electric charge carried by a single proton or, equivalently, the magnitude of the negative electric charge carried by a single electron. The term "net elementary charge of a feedstock" means the net elementary charge of phosphorus and the at least one metal contained in the feedstock, while the term "net elementary charge of the feedstock" is used for brevity. Also, when a numerical value of the net elementary charge of a feedstock is given, the unit is mmol elementary charge/kg of feedstock in question, while also mmol elementary charge/kg may be used for brevity. By "dissolved impurities" in this text are meant for example impurities which remain in the liquid phase after filtration with 2 μm filter, i.e. impurities in solid form that are removed by such filtration are not considered dissolved impurities in this text. Further, in this description, "at least one" means that there is one or more of the items mentioned. When "heat treatment" is mentioned, it is meant the heat treatment of the purification, i.e. the purification heat treatment, and not any hydrotreatment using heat. By "purification" it is meant that the amount of dissolved impurities is reduced. Whenever purification or removal or reduction of the amount of impurities is mentioned, the dissolved impurities are meant, even if not always mentioned.

According to an aspect of the present invention, there is provided a method for producing renewable hydrocarbons from an oxygen containing renewable feedstock, the feedstock comprising dissolved impurities selected from impurities comprising phosphorus and impurities comprising at least one metal, the feedstock further comprising at least one of triglycerides and free fatty acids, the method comprising a) obtaining a net elementary charge Q1 based on phosphorus and the at least one metal in a first feedstock;

b) mixing the first feedstock with an elementary charge balancing component to obtain the feedstock to be purified, which feedstock to be purified has a net elementary charge Qt based on phosphorus and the at least one metal within a range of from −5 to 15 mmol elementary charge/kg of the feedstock to be purified;

c) subjecting the feedstock to be purified to heat treatment at a temperature of 180-400° C., in order to precipitate compounds containing said phosphorus and said at least one metal;

d) removing the formed precipitate compounds comprising said at least one metal and said phosphorus, to obtain a purified feedstock; and e) subjecting the purified feedstock to a hydrotreatment using a catalyst sensitive to at least one of said impurities.

The present method thus provides an efficient way of purifying various renewable feedstocks, which comprise phosphorus and/or metal(s), in order for these feedstocks to be used in hydrotreatment, for manufacturing renewable hydrocarbons. Phosphorus is typically in the form of phospholipids in the feedstocks to be processed, and metals can be present as salts of fatty acids, or in the phospholipids. The metals typically comprise alkali or alkaline earth metals, and some other metals, like Fe, Al, Cr, Pb, Mn, Zn, W, Ni and Cu. The metals may be selected from the group consisting of Na, K, Mg, Ca, Fe, Al, Cr, Pb, Mn, Zn, W, Ni and Cu, or any combinations thereof. The term "net elementary charge based on phosphorus and a least one metal in a feedstock" means that all metals and phosphorus in the feedstock are considered. There may be only one metal present in the feedstock, but typically there are several metals present that all need to be taken into account. If the amount of metal is near or beyond the detection limit (i.e. too small to be detected), such as e.g. less than 1 ppm or less than 0.1 ppm, it does not essentially influence the process.

After heat treatment, the purified feedstock comprises dissolved phosphorus at an amount of maximum 10 mg/kg of the feedstock and dissolved metals at an amount of maximum 40 mg/kg of the feedstock. After further bleaching, the purified feedstock comprises dissolved phosphorus at an amount of maximum 5 mg/kg of the feedstock and dissolved metals at an amount of maximum 10 mg/kg of the feedstock.

The heat treatment reduces the amount of dissolved phosphorus of at least 60% when compared to the feedstock to be purified, and the amount of dissolved metals of at least 60% when compared to the feedstock to be purified. In case bleaching is further carried out after the heat treatment, the amount of dissolved phosphorus is reduced by at least 80% when compared to the feedstock to be purified, and the amount of dissolved metals by at least 80% when compared to the feedstock to be purified.

The feedstocks that can be processed with the present method comprise triglycerides and/or free fatty acids. Especially in hydrotreatment, phosphorus and metals are catalyst poisons. While high contents of metals can mostly be removed by suitable acid addition, removal of phosphorus is more difficult.

The impurities which are in dissolved form in the feedstocks to be treated thus comprise impurities comprising phosphorus and impurities comprising one or more metals. Phosphorus and the one or more metals may also be present in the same impurity, but most typically they are in different impurities, i.e. as separate compounds within the feedstock. In the present description, a treated feedstock means a feedstock comprising less soluble phosphorus and/or metal(s) compared to the original feedstock.

For example, feedstocks such as acidulated soapstock (ASK), dry rendered poultry fat (AFP) and brown grease (BG) cannot be purified on their own with only bleaching to an extent that they would thereafter be suitable for hydrodeoxygenation (HDO). Typically, in a feedstock consisting of acidulated soapstock or poultry fat, a high amount of residual phosphorus remains after the conventional purification methods. For brown grease, the main problem is the high content of metals. The content of metals is so high that the product exhibits a very high filtration resistance, or even plugging, in bleaching of brown grease.

However, it is possible to blend for example acidulated soapstock and brown grease, or poultry fat and brown grease, and when the blending is optimum, both phosphorus and metals can be removed from the feedstock blend, using the present method, and the resulting purified feedstock is usable in hydrotreatment. Typically, the amount of dissolved impurities in the feedstock of various processes using a catalyst has an impact on the catalyst lifetime, the higher the amount of certain dissolved impurities, the shorter the catalyst life. In one example, the amount of dissolved phosphorus in the feedstock for HDO is preferably below 2 ppm, while the amount of dissolved metals is as low as possible, for example maximum 5 ppm.

The various possible renewable feedstocks include materials with high to very high amounts of phosphorus and/or metals. For example, acidulated soapstock and poultry fat may comprise 100-400 ppm of phosphorus, while some oils and fats originating from algae may have several thousands of ppm of phosphorus. Brown grease typically has a phosphorus content that is below 100 ppm, while the amount of metals can be hundreds or thousands ppm. The present method is thus particularly suitable for feedstocks having high contents of phosphorus and/or metals, but may of course also be used for materials having lower contents of impurities.

According to one embodiment, the renewable feedstock to be treated with the present method, i.e. purified, contains dissolved impurities comprising phosphorus in an amount of at least 50 ppm, or at least 100 ppm, or at least 200 ppm, or at least 300 ppm, or at least 400 ppm, or at least 500 ppm. Such feedstock may contain dissolved impurities comprising at least one metal in an amount of at least 200 ppm, or at least 500 ppm, or at least 1000 ppm.

Without wishing to be bound by a theory, it is believed that during the purification heat treatment of the feedstock, metal phosphates are formed presumably from the phospholipids and metals present in the feedstock (for example in the phospholipids or in the fatty acids), and the formed metal phosphates can thereafter be removed from the feedstock. The metal phosphates can be removed for example as precipitates, which can be easily filtered. Less dissolved metals and phosphorus will thus be present in subsequent processing, and for example in hydrotreatment of the purified feedstock to fuels, catalyst deactivation and plugging can be reduced.

The aim is thus to balance the metals and phosphorus in the feedstock to a sufficient degree, so that metal phosphate formation in heat treatment is optimal, i.e. ensuring enough metal cations to balance the phosphate (anions) released from phospholipids.

In other words, the feedstock after heat treatment and optional precipitate removal is preferably suitable for hydrodeoxygenation. Typically, the feedstock entering into a hydrodeoxygenation reactor or a catalyst bed thereof should not include more than 10 ppm, preferably not more than 5 ppm, more preferably not more than 1 ppm alkali metal and alkaline earth metal impurities, calculated as elemental alkali and alkaline earth metals; not more than 10 ppm, preferably not more than 5 ppm, more preferably not more than 1 ppm other metals, calculated as elemental metals; not more than 30 ppm, preferably not more than 15 ppm, more preferably not more than 5 ppm phosphorus containing impurities, calculated as elemental phosphorus. For any impurities other than phosphorus, and metals such as sodium, potassium, magnesium, calcium and iron, any excess amounts are typically removed by other methods known per se.

The metal phosphates can be removed as precipitates, which can be easily filtered. The precipitates can be for example iron phosphates, sodium phosphates, potassium phosphates, magnesium phosphates and/or calcium phosphates. Following the heat treatment, the amount of dissolved metals and phosphorus is sufficiently low for subsequent processing, and for example in hydroprocessing of the treated feedstock to fuels, catalyst deactivation and plugging can be avoided. The treated or purified feedstock is thus a feedstock comprising less phosphorus and/or metals compared to the original feedstock. In case filtering is used for removing the precipitated compounds, the filtering preferably removes at least 90 wt-% of the precipitates, such as at least 95 or 99 wt-% of them. When another method for removing the precipitates from the heat treated feedstock is used, the efficiency of the removal is preferably within the same range as for filtering.

By less dissolved impurities or reduced amount of dissolved impurities in this description it is meant that the amount of dissolved phosphorus and/or metals is for example at most 20 wt-% of the original amount of these dissolved impurities. Their amounts can be for example, independently selected, at most 20, 15, 10, 5, 3 or 1 wt-% of the original amount of each dissolved impurity.

The term "hydrotreating" or "hydrotreatment" refers to a chemical unit operation in which reaction of hydrogen is used to remove impurities, such as oxygen, sulphur, nitrogen, phosphorous, silicon and metals, especially as part of oil refining. Hydrotreatment also encompasses hydroisomerisation. Hydrotreatment can be performed in one or several steps in one or more reactor units or catalyst beds. Preferably, the hydrotreatment is carried out in two steps. For example, a hydrotreatment in one step may consist of hydrodeoxygenation and hydroisomerisation in a single step, and a hydrotreatment in two steps may consist of first a hydrodeoxygenation step, followed by a hydroisomerisation step.

The hydrotreatment thus refers to hydrodeoxygenation (HDO), i.e. essentially removal of oxygen as water in the presence of molecular hydrogen under the influence of a (HDO) catalyst; hydroisomerisation (HI), i.e. branching n-paraffins to form i-paraffins in the presence of molecular hydrogen under the influence of a (HI) catalyst of; hydrodesulphurisation (HDS), i.e. removal of sulphur as hydrogensulphide by means of molecular hydrogen under the influence of a (HDS) catalyst; hydrodemetallisation (HDM), i.e. removal of metals by trapping them with a (HDM) catalyst; hydrodenitrification (HDN), i.e. removal of nitrogen by means of molecular hydrogen under the influence of a (HDN) catalyst; hydrodearomatisation (HDA), i.e. saturation or ring opening of aromatics by means of molecular hydrogen under the influence of a (HDA) catalyst. Typically, hydrotreatment means deoxygenation by hydrogenation i.e. hydrodeoxygenation (HDO) and hydrogenation of double bonds. Additionally, hydroisomerisation may be carried out, either simultaneously with HDO or in sequence.

In order to obtain an optimal result of the heat treatment, i.e. to lower the level of dissolved impurities in the feedstock to a sufficient degree, the net elementary charge $Q1$ of the first feedstock is balanced with an elementary charge balancing component. The elementary charge balancing component is selected such that after mixing of the first feedstock with the elementary charge balancing component to obtain the feedstock to be purified, the feedstock to be purified has a net elementary charge $Qt$ within a range of from −5 to +15 mmol elementary charge/kg of the feedstock to be purified. The net elementary charge $Qt$ of the feedstock to be purified is thus from −5 to +15 mmol elementary charge/kg of the feedstock to be purified. The net elementary charge $Qt$ can be for example from −5, −4.5, −4, −3.5, −3, −2.5, −2, −1.5, −1, −0.5, 0, 1, 2, 3, 4, 5, 6, 7, 8, 9, 10, 11, 12, 13 or 14 mmol elementary charge/kg up to −4, −3.5, −3, −2.5, −2, −1.5, −1, −0.5, 0, 1, 2, 3, 4, 5, 6, 7, 8, 9, 10, 11, 12, 13, 14 or 15 mmol elementary charge/kg of the feedstock to be purified.

The net elementary charge of the feedstock to be treated is typically selected in view of the further treatment of the feedstock. Indeed, different further treatments require different levels of purity with respect to phosphorus and metals. For example, the further treatment may use a catalyst that is sensitive to one of the impurities in question, and different catalysts have different tolerance to impurities. The examples below show that the closer the net elementary charge of the feedstock to be treated is to 0, the better the purification result, i.e. the more the amount of dissolved impurities in question can be reduced in the feedstock. The net elementary charge of the feedstock to be treated may also depend on the net elementary charge of the components of the feedstock to be treated. For example, some algal oils may have a net elementary charge up to −70 mmol elementary charge/kg, while some brown grease may have a net elementary charge up to +200 mmol/kg. For such feedstocks, balancing their charge to the limits of −5 to +15 mmol elementary charge/kg of the feedstock means that the treated feedstock can be used in hydrotreatment. The present charge balancing thus provides a means to utilise a wide variety of feedstock qualities and makes further processing cheaper and easier, i.e. it is less costly to remove certain impurities. For example, the net elementary charge of the feedstock to be treated can be from −1 to +5 or from −0.5 to +3 mmol elementary charge/kg, when the treated feedstock is to be used in hydroprocessing with catalyst sensitive to phosphorus and/or metals. According to an embodiment, in particular sodium and iron are problematic, and thus, in case the feedstock comprises significant amounts of either or both of these metals, and the later use is with a sensitive catalyst, the net elementary charge of the feedstock to be treated should be as close to 0 as possible, typically within the range of −0.5 to +1 mmol elementary charge/kg of the feedstock to be treated.

According to one preferred embodiment, the net elementary charge before heat treatment is above 0 mmol elementary charge/kg, so that there is an excess of metals rather than phosphorus in the feedstock to be treated. The optimal net elementary charge depends also on the feedstock(s). For example, when the feedstock(s) has a significant phosphorus content, the net elementary charge would preferably be above 0 mmol elementary charge/kg, to ensure effective reduction of dissolved phosphorus. In practice, the total net elementary charge of the feedstock to be treated is preferably slightly positive (meaning a surplus of metals) to ensure the dissolved phosphorus is converted to insoluble phosphorus compounds as well as possible. Having a slight surplus of dissolved metals in the feed after the present heat treatment can be handled, if need be, by removal of the metals with sufficient acid dosage in a subsequent purification step. In case of the above example of acidulated soapstock and brown grease, the conversion of dissolved metals to metal phosphates leads to good filtration throughputs in subsequent bleaching, for example, and the filtration challenges which are typical for especially brown grease blends are not encountered when the present treatment method is used.

There are different ways of balancing the net elementary charge of the feedstocks. According to a method that has proven to be effective, this is made via net elementary charge based on phosphorus and metals. According to an embodiment, the net elementary charge Q based on phosphorus and the at least one metal is obtained by equation (I)

$$Q=(C_P \times Q_P)+\Sigma_i(C_{M_i} \times Q_{M_i}) \quad (I)$$

wherein
$C_P$ is the concentration of dissolved phosphorus in the feedstock in mmol/kg of feedstock,
$Q_P$ is the elementary charge of dissolved phosphorus in the feedstock,
$C_{M_i}$ is the concentration of dissolved metal i in the feedstock in mmol/kg of feedstock,
$Q_{M_i}$ is the elementary charge of the dissolved metal i in the feedstock, and
i is the number of dissolved metals taken into account.

In this equation, i is 1–n, i.e. i is the number of dissolved metals, and i runs from 1 to a number n, n being the maximum number of different dissolved metals. For example, i can be 1, 2, 3, 4, 5, 6, 7 or 8.

The total net elementary charge Qt is then the sum of the net elementary charges of each feedstock and optional charge balancing component different from a feedstock, i.e.

$$Qt=Q1+Q2+Q3+ \ldots +Qc$$

wherein
Q1 is the net elementary charge of the first feedstock, Q2 that of an optional second feedstock, Q3 that of an optional third feedstock, etc., and
Qc is the elementary charge of the optional charge balancing component different from a feedstock.

The net elementary charge is thus the sum of all the net elementary charges of all the metals and phosphorus present.

In this formula, the feedstock can be the first feedstock or the second feedstock, if used, or any other feedstock if several feedstocks are used. In this application, the metal i is typically sodium, potassium, magnesium, calcium and/or iron. The elementary charge of phosphorus is −3 e in this equation, as assumed herein to be in the form of a phosphate. The elementary charge of sodium is +1 e, that of potassium +1 e, that of magnesium +2 e, that of calcium +2 e, and that of iron +3 e, depending on the compounds present. In case there are other dissolved metals present in the feed in significant amounts, for example in an amount higher than 1 ppm, those are also considered in the calculation of the net elementary charge, with their elementary charge. The same limit of significant amount (for example 1 ppm) may also be used for sodium, potassium, magnesium, calcium and iron, again depending on the further use of the feedstock. The feed may also comprise certain metals in amounts that cannot be readily detected, and such metals and their elementary charges cannot thus be taken into account. The amounts are however so small that they do not essentially effect the outcome. The limit may thus be 1 ppm, or 0.5 ppm, or 0.1 ppm. The elementary charge of a metal is the valence the metal typically has when forming a metal salt, such as metal phosphate. A person skilled in the art may also use another method for this determination.

Indeed, in the present method, a net elementary charge Q1 of a first feedstock is first obtained. The net elementary charge may be obtained as indicated above. Typically, for the measurement of the various concentrations, a sample of the feedstock is filtered to remove any solid particles, and the amounts of various metals and phosphorus are measured. Thereafter, the equation (I) is used to obtain the net elementary charge. It has been seen that it is the dissolved phosphorus and metal(s) that are converted to metal phosphate precipitate and hence these dissolved impurities need to be balanced (adjusting net elementary charge close to zero) for best result. Therefore, only the concentration of dissolved phosphorus and metals (not solid impurities) are used in the net elementary charge calculation. Feedstock to be treated by heat treatment can contain solid precipitate, however, these are not affected by the treatment, and hence the feedstock to be treated need not to be filtered before balancing or treatment.

Thereafter, the first feedstock is mixed with an elementary charge balancing component to obtain the feedstock to be purified. The elementary charge balancing component is selected in such a manner that the resulting feedstock to be purified has a net elementary charge Qt within a range of from −1 to 15 mmol elementary charge/kg of the feedstock to be purified. This step thus requires knowing also the net elementary charge of the elementary charge balancing component and thereafter calculating the appropriate amount of the elementary charge balancing component, in order to arrive at the net elementary charge Qt to be in the desired range. The range is selected such that the required purification degree is achieved, i.e. that the amount of phosphorus at least is sufficiently lowered. Advantageously, also the amount of metals is lowered to such an extent that no further metal removal is required.

It is also possible to mix two feedstocks and an elementary charge balancing component which is different from a feedstock, i.e. which is not a feedstock as such. Similarly, more than two feedstocks can be mixed, and the remaining net elementary charge of the feedstock mixture can be then balanced with an elementary charge balancing component. If several feedstocks are mixed, the net elementary charge of each feedstock may be first determined, and then the feedstocks be mixed in appropriate amounts, and then the resulting mixture's net elementary charge determined before further mixing with an elementary charge balancing component.

The metal and phosphorus concentrations are thus calculated on molar basis and further multiplied by their assumed elementary charges, an elementary charge equilibrium point is found as the blend ratio, at which the negative elementary charge of the phosphorus, assumed as trivalent $PO_4^{3-}$ (phosphate) is equilibrated by the sum of metal elementary charge. At the elementary charge equilibrium point, or at a point sufficiently close to elementary charge equilibrium point for the further processing of the feedstock according to the present method, phosphorus, which is difficult to remove for example from acidulated soapstock or dry rendered poultry fat can be paired to metals from for example brown grease and form metal precipitate in heat treatment.

Preferably, the net elementary charge is as close to 0 as possible, so that it is possible to remove both phosphorus and metals at the same time.

After mixing, the feedstock to be purified is heat treated, and the precipitated metal and phosphorus containing compounds are removed, whereby a purified feedstock is obtained, and the purified feedstock can be subjected to further treatment either directly, after further purification or pre-treatment steps, or after storage and/or transportation. Indeed, the feedstock, after the present purification steps, may still need to be further purified to remove some other impurity or impurities. The method may thus comprise other purification steps between the purification heat treatment and the hydrotreatment.

The purification heat treatment is carried out at an elevated temperature and typically under certain pressure. The purification heat treatment may also comprise mixing of the feedstock, but it is not mandatory. Typically, the purification heat treatment is carried out in the absence of added hydrogen and in the absence of catalyst. The heat treatment may also be carried out in the absence of added acid. It is possible to add an acid prior to the purification heat treatment, but usually not during the purification heat treatment as such. Moreover, the heat treatment may be performed in the presence of added adsorbent, using e.g. a silica-based adsorbent, which is efficiently contacted with the feedstock to be purified. Steam (water vapour) may be used during the heat treatment. If water is used, it is used typically in an amount of at most 1 wt-%.

It is to be noted that typically the various feedstocks, especially those that have very mixed origins, are stored also under elevated temperature, typically over 50° C., so as to keep the feedstock in liquid form, and to avoid segregation within the feedstock.

The purification heat treatment is carried out at a temperature of 180-400° C. According to an embodiment, it is carried out at a temperature of 180-310° C. According to another embodiment, it is carried out at a temperature of 220-300° C. According to yet another embodiment, the heat treatment is carried out at a temperature of 200-280° C. Such temperature range typically allows to both best avoid undesirable side reactions and to have optimal size of reactors. The temperature of the heat treatment can thus be for example from 180, 185, 190, 195, 200, 205, 210, 215, 220, 225, 230, 235, 240, 245, 250, 255, 260, 265, 270, 280, 285, 290, 300, 310, 320, 330, 340, 350, 360, 370 or 380° C. up to 190, 195, 200, 205, 210, 215, 220, 225, 230, 235, 240, 245, 250, 255, 260, 265, 270, 280, 285, 290, 295, 300, 305, 310, 320, 330, 340, 350, 360, 370, 380, 390 or 400° C. The temperature is selected such that an optimal result of removal of the given dissolved impurities is obtained. Typically, the lower the temperature, the higher the required reaction time. Thus, the temperature may also be selected based on the other steps of the process, for example such that the heat treatment time is optimal for the feeding of the heat treated feedstock to a further step. The temperature also depends on the dissolved impurities to be removed, as they may react differently. Also the size of the reactor for the heat treatment may play a role in the choice of the optimal temperature. Side-reactions may also play a role, as some feedstocks may comprise components that start to oligomerise or crack in certain temperatures.

Phospholipids typically start to decompose in a temperature of 160-180° C., however, for full decomposition the retention time is long and it is often more practical to use higher treatment temperature. Treatment conditions can be e.g. 200° C./210 min, 220° C./65 min, 250° C./20 min, 280° C./10 min for similar treatment effect.

According to an embodiment, the heat treatment is carried out for a period of time of 1 minute to 3 hours, preferably 15 minutes to 3 hours. The required time typically depends on the temperature, and the higher the temperature, the shorter the required treatment time. Some feedstocks may also be more sensitive to heating than others. The duration of the heat treatment can thus be for example from 1 min, 5 min, 10 min, 15 min, 30 min, 45 min, 1 hour, 1 hour 15 min, or 1 hour 30 min up to 15 min, 30 min, 45 min, 1 hour, 1 hour 15 min, 1 hour 30 min, 1 hour 45 min, 2 hours, 2 hours 15 min, 2 hours 30 min, 2 hours 45 min or 3 hours. It is also possible to use longer treatment times than 3 hours, such as up to 4 or 5 hours. By the period of time of the heat treatment is here meant the effective time, which a person skilled in the art is readily able to calculate based on the reactor type, whether the process is a continuous or a batch process, and on the time of heating and cooling.

Typically, the heat treatment is carried out in a pressure reactor, and the pressure in the heat treatment is 2-20 MPa. The heat treatment can be carried out in equilibrium pressure, at elevated pressure or at a pressure lower than the equilibrium pressure.

There are at least two options for the type of the elementary charge balancing component. Indeed, it can be a second feedstock having a net elementary charge Q2 based on phosphorus and the at least one metal (positive or negative net elementary charge), or selected from metal containing compounds capable of providing metal cations (positive elementary charge) and phosphorus containing compounds capable of providing phosphorus containing anions (negative elementary charge). It is also possible to use both options, depending on the feedstocks available. In cases where the elementary charge balancing component is a second feedstock, the second feedstock has a net elementary charge Q2 based on phosphorus and the at least one metal (e.g. positive) that is electrically opposite to the net elementary charge Q1 based on phosphorus and the at least one metal (e.g. negative) in the first feedstock. By electrically opposite in this description it is meant the polarity and not necessarily the magnitude of the net elementary charge. That is, if the first feedstock has a negative net elementary charge (i.e. an excess of phosphorus compared to metals), the second feedstock and/or metal containing compound capable of providing metal cations should have a positive net elementary charge (i.e. an excess of metals compared to phosphorus), and if the first feedstock has a positive net elementary charge, the second feedstock and/or the phosphorus containing compound capable of providing phosphorus containing anions should have a negative net elementary charge.

Indeed, when the present type of feedstocks arrive at a treatment station, they typically come with an analysis certificate, indicating the amount of various constituents in the feedstock. Based on the contents, the elementary charge balancing component is selected to be either another feedstock with suitable amounts of phosphorus and/or metal, or a suitable type and amount of metal containing compounds having a positive elementary charge or phosphorus containing compounds having a negative elementary charge.

Examples of such metal containing compounds capable of providing metal cations are for example sodium hydroxide, sodium soap, potassium hydroxide, potassium soap, calcium hydroxide, calcium soap, magnesium hydroxide, magnesium soap, iron hydroxide, iron soap, and mixtures thereof. In this context, a soap is a salt of a fatty acid, i.e. for example sodium soap is a sodium salt of a fatty acid, such as sodium stearate.

Examples of such phosphorus containing compounds capable of providing phosphorus containing anion(s) are for example phosphoric acid, a phospholipid, and mixtures thereof.

The removal of the formed precipitate compounds in step d) may be carried out by at least one method selected from filtration, settling, centrifugation, water washing, degumming and bleaching. According to an embodiment, said removal is carried out by degumming with an acid and/or water, followed by centrifugation. According to another embodiment, said removal is carried out by bleaching in the presence of an acid and an adsorbent.

According to an embodiment, the method thus further comprises at least one of degumming and bleaching after the heat treatment. The method may also comprise both degumming and bleaching, and these can be carried out in either order, although it is more typical to first carry out degumming and then bleaching.

In the embodiment where the further treatment is degumming, it can be carried out using acid, such as phosphoric acid and/or citric acid, as well as water to the treated feedstock, mixing, and separating the impurities to be removed by centrifugation. The amount of acid is typically in stoichiometric excess, and it hydrates the remaining metals, making them thus easier to remove.

In the embodiment where the further treatment is bleaching, it can be carried out in the presence of an acid, such as citric acid and/or phosphoric acid. The bleaching is typically carried out in the presence of a small amount of water. Bleaching can also be preceded by filtration of the precipitate formed in the heat treatment.

Bleaching earth or other adsorbent such as silica can be added to the treated feedstock to adsorb impurities. Temperature of the bleaching can be for example 80-90° C. After this, the bleached product is typically dried and filtered to remove the solids together with impurities.

The feedstock can be any kind of animal and/or plant based material containing oxygen. Typically, the feedstock contains for example triglycerides and/or free fatty acids. In an embodiment, the feedstock is selected from the group consisting of:

plant fats, plant oils, plant waxes; animal fats, animal oils, animal waxes; fish fats, fish oils, fish waxes;

fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis;

esters obtained from plant fats, plant oils, plant waxes; animal fats, animal oils, animal waxes; fish fats, fish oils, fish waxes; and mixtures thereof by transesterification;

metal salts of fatty acids obtained from plant fats, plant oils, plant waxes; animal fats, animal oils, animal waxes; fish fats, fish oils, fish waxes, and mixtures thereof by saponification;

esters obtained by esterification of free fatty acids or plant, animal and fish origin with alcohols;

fatty alcohols or aldehydes obtained as reduction products of fatty acids from plant fats, plant oils, plant waxes; animal fats, animal oils, animal waxes; fish fats, fish oils, fish waxes, and mixtures thereof;

recycled food grade fats and oils, and fats, oils and waxes obtained by genetic engineering;

dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds;

compounds derived from algae, and mixtures of any of these materials.

In an embodiment of the invention, the feedstock is based on a non-edible oil/fat. In another embodiment, the feedstock comprises plant oil. In a further embodiment, the plant oil is obtained as a by-product from the forest industry. According to a particular embodiment, the feedstock is selected from waste and residues from animal fat or oil, plant fat or oil, and fish fat or oil, and mixtures thereof.

An exemplary feedstock comprises at least triglycerides. Most typical exemplary feedstocks are animal fats and palm oil fatty acid, especially those originating from waste and residues.

A further exemplary feedstock comprises at least fatty acids. Most typical feedstock are various plant oils, and e.g. tall oil materials, such as crude tall oil.

The natural fats or derivatives thereof may be provided in pure form or as part of a feedstock containing other components. Preferably, the feedstock contains at least 20 wt-%, more preferably at least 30 wt-%, most preferably at least 40 wt-%, of pure natural fat or natural oil or their derivatives.

The feedstock may comprise $C_8$-$C_{24}$ fatty acids, derivatives of said fatty acids, such as esters of fatty acids as well as triglycerides of fatty acids, metal salts of said fatty acids, or combinations of thereof. The fatty acids or fatty acid derivatives, such as esters may be produced via hydrolysis of bio-oils or by their fractionalization, or by esterification reactions of triglycerides.

The feedstock may also include derivatives of natural fats including mono- or diglycerides of $C_{10}$-$C_{28}$ fatty acids, $C_{10}$-$C_{28}$ fatty acids, non-glyceride $C_{10}$-$C_{28}$ fatty acid esters, $C_{10}$-$C_{28}$ fatty alcohols, $C_{10}$-$C_{28}$ fatty aldehydes and $C_{10}$-$C_{28}$ fatty ketones. The $C_{10}$-$C_{28}$ fatty acids, their mono- and diglycerides, are typically prepared by hydrolysis of the corresponding triglyceride. The non-glyceride $C_{10}$-$C_{28}$ fatty acid esters are mainly prepared from the triglycerides by transesterification. The $C_{10}$-$C_{28}$ fatty alcohols, aldehydes and ketones are prepared by reduction, usually by hydrogenation, of the corresponding fatty acids. Advantageously, the feedstock hydrocarbons may be of $C_{10}$-$C_{24}$.

The feedstock may be also selected from lauric-myristic acid group ($C_{12}$-$C_{14}$) including milk fats, palmitic acid group ($C_{16}$) including earth animal fats, stearic acid group ($C_{18}$) including earth animal fats, linoleic acid group (unsaturated $C_{18}$) including whale and fish oils, erucic acid group (unsaturated $C_{22}$) including whale and fish oils, oleo stearic acid group (conjugated unsaturated $C_{18}$) including whale and fish oils, fats with substituted fatty acids (ricin oleic acid, $C_{18}$) such as castor oil, oils obtained from plants by gene manipulation, and mixtures of any two or more thereof.

The derivatives of natural fats also include any of the aforementioned natural fats and derivatives, the hydrocarbon chain of which has been modified e.g. by substitution, branching or saturation.

The oils of the feedstock may be classified as crude, degummed, heat treated and RBD (refined, bleached, and deodorised) grade, depending on the level of pre-treatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, and mixtures of any two or more thereof.

According to an embodiment, the first feedstock and the optional second feedstock comprises at least one of animal fat, animal oil, plant fat, plant oil, fish fat, fish oil, microbial oil, algae oil, waste fat, waste oil, residue fat, residue oil, a sludge originating from plant oil production. In case more than one or two feedstocks are used, the above may apply to all the feedstocks.

According to another embodiment, the first feedstock and the optional second feedstock comprises at least one of acidulated soapstock, (ASK), poultry fat, dry rendered poultry fat (AFP), brown grease (BG), used cooking oil (UCO), tall oil, fraction of tall oil, crude tall oil (CTO), tall oil pitch (TOP), palm oil mill effluent (POME), crude palm oil (CPO), palm oil, palm seed oil, palm fatty acid distillate (PFAD), babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil (SBO), technical corn oil, rapeseed oil (RSO), colza oil, canola oil, sunflower oil, hemp seed oil, olive oil, linseed oil, mustard oil, peanut oil, castor oil, coconut oil, lard, tallow, train oil, spent bleaching earth oil (SBEO), lignocellulosic based feeds, or mixtures thereof.

According to an embodiment, said hydrotreatment comprises hydrodeoxygenation and isomerisation, wherein a temperature in the range from 250 to 400° C., a pressure in the range from 1 to 2 MPa and a hydrogen flow in the range from 350 to 1500 Nl $H_2$/l feed are used. Nl $H_2$/l means normal litres of hydrogen per litre of the feed into the HDO reactor.

According to another particular embodiment, the hydrodeoxygenation reaction conditions comprise temperature in the range from 250 to 400° C., pressure in the range from 2 to 8 MPa, a WHSV (weight hourly space velocity) in the range from 0.5-3 $h^{-1}$, and hydrogen flow of 350-900 Nl $H_2$/l feed, and a hydrodeoxygenation catalyst.

The hydrotreatment may be performed at a temperature from 270 to 380° C., such as from 275 to 360° C., or from 300 to 350° C. The temperature may be for example from 250, 255, 260, 265, 270, 275, 280, 285, 290, 295, 300, 305, 310, 315, 320, 325, 330, 335, 340, 345, 350, 355, 360, 365, 370, 375, 380 or 385° C. up to 265, 270, 275, 280, 285, 290, 295, 300, 305, 310, 315, 320, 325, 330, 335, 340, 345, 350, 355, 360, 365, 370, 375, 380, 385, 390, 395 or 400° C. The pressure during hydrotreatment may be from 4 to 20 MPa. The pressure can be for example from 1, 2, 3, 4, 5, 6, 7, 8, 9, 10, 11, 12, 13, 14, 15, 16, 17 or 18 MPa up to 3, 4, 5, 6, 7, 8, 9, 10, 11, 12, 13, 14, 15, 16, 17, 18, 19 or 20 MPa.

According to an embodiment, and in particular in the case of HDO, the weight hourly space velocity (WHSV) used is in the range from 0.25 to 3.0 $h^{-1}$, preferably from 0.7 to 3.0 $h^{-1}$, more preferably from 1.0 to 2.5 $h^{-1}$, most preferably from 1.0 to 2.0 $h^{-1}$, depending on the hydrogen consumption. The hydrogen gas flow, especially for HDO, may be in the range from 350 to 1500 Nl $H_2$/l feed, more preferably from 350 to 900 Nl $H_2$/l feed, most preferably from 350 to 750 Nl $H_2$/l feed, such as from 350 to 500 Nl $H_2$/l feed.

The hydrotreating catalyst typically comprises at least one component selected from IUPAC group 6, 8 or 10 of the Periodic Table. According to an embodiment, the catalyst comprises at least one of nickel, molybdenum, cobalt, tungsten, and combinations thereof. The catalyst may for example comprise NiMo, CoMo, NiW or CoNiMo. The catalyst may also comprise a support comprising at least one of alumina, silica, zeolite, and a combination thereof.

According to another embodiment, the catalyst comprises at least one of platinum, palladium, nickel and combinations thereof, a zeolite selected from ZSM-12, ZSM-23, SAPO-11, SAPO-41 and fernerite, on a support of alumina and/or silica. The hydrotreating catalyst may thus be a supported Pd, Pt, Ni, NiW, NiMo, CoMo or CoNiMo catalysts and the support may be zeolite, zeolite-alumina, alumina and/or silica. The catalyst may be for example NiW/$Al_2O_3$, NiMo/$Al_2O_3$ or CoMo/$Al_2O_3$. In particular the hydrotreating catalyst may be a sulphided NiMo or CoMo catalyst. In case the feed, even after purification, comprises sulphur, the catalyst does not necessarily need to be sulphided.

According to an embodiment, the hydrotreatment conditions are tailored to best serve the stream in question. In practice, this may mean that according to the desired end product, the reaction conditions and the catalyst used may slightly vary.

The step of hydrotreatment may also comprise, prior to the hydrotreatment as such, mixing the feedstock purified with the present process with another renewable feedstock or several different renewable feedstocks for co-hydrotreating them.

Hydrodeoxygenation may be carried out as depicted e.g. in FI 100248, EP 1741768, WO 2007/068795, WO 2016/062868 or EP 2155838, and using a conventional hydrotreatment catalysts and hydrogen gas.

In one embodiment the hydrodeoxygenation takes place at reaction conditions comprising a temperature in the range from 100 to 500° C., such as from 250 to 400° C., or from 280-350° C., or at temperature of 300-330° C.; and at a pressure in the range from 0.1 to 20 MPa, such as from 0.2 to 8 MPa. The weight hourly space velocity (WHSV) may be in the range from 0.5 to 3.0 l/h, such as from 1.0 to 2.5 l/h, or from 1.0 to 2.0 l/h. The $H_2$ flow may be in the range from 350 to 900 Nl $H_2$/l feed, such as from 350 to 750, or from 350 to 500, in the presence of a hydrodeoxygenation catalyst.

Advantageously, HDO is performed to obtain hydrodeoxygenated material comprising less than 1 wt-% oxygen.

Part of the deoxygenated material may be recycled to the hydrogenation process. Preferably, the ratio of the fresh feed i.e. purified material obtained in the previous step to the recycled deoxygenated material is from 2:1 to 20:1.

According to an embodiment, hydrotreatment comprises hydrodeoxygenation and hydroisomerisation, simultaneously or in sequence. When conducted in sequence, hydrotreatment comprises first hydrodeoxygenation and then hydroisomerisation.

Isomerisation can be carried out in a conventional hydroisomerisation unit, such as those depicted in FI 100248, EP 1741768, WO 2007/068795, WO 2016/062868 or EP 2155838. Hydrogen is added into the hydroisomerisation step.

Both the hydrodeoxygenation step and hydroisomerisation step may be conducted in the same reactor, and even in the same reactor bed. The hydroisomerisation catalyst may be a noble metal bifunctional catalyst such as a Pt containing commercial catalyst, for example Pt-SAPO or Pt-ZSM-catalyst or for example a non-noble catalyst, such as NiW. The hydrodeoxygenation and hydroisomerisation steps may be performed in the same catalyst bed using e.g. the NiW catalyst in both the hydrodeoxygenation and isomerisation.

The isomerisation step can be performed at a temperature from 250 to 400° C., such as from 280 to 370° C., or from 300 to 350° C. Pressure may be from 1 to 6 MPa, or from 2 to 5 MPa, or from 2.5 to 4.5 MPa. The WHSV may be from 0.5 to 3 l/h, such as from 0.5 to 2 l/h, or from 0.5 to 1 l/h, and $H_2$ flow may be from 100 to 800 Nl $H_2$/l feed, or from 200 to 650, or even from 350 to 500 Nl $H_2$/l feed.

During isomerisation n-paraffins are branched i.e. forming i-paraffins. Preferably, the conditions are chosen such that the branches are located at or near the terminal ends of the molecules, and therefore the cold flow properties of renewable fuels are improved.

The isomerisation treatment is a step which predominantly serves to isomerise the hydrodeoxygenated raw material. That is, while most thermal or catalytic conversions (such as HDO) result in a minor degree of isomerisation (usually less than 5 wt-%), the isomerisation step which may be employed in the present process is a step which leads to a significant increase in the content of isoparaffins.

During hydroisomerisation of n-paraffins to hydrocarbon components some cracking may occur. Therefore, the selection of the catalyst and optimisation of reaction conditions are important during the isomerisation step, if it is wished to avoid cracking. Due to cracking during isomerisation renewable diesel and naphtha are formed, and may even be formed from longer carbon chain length n-paraffins such as those of renewable base oil. The renewable diesel fuel thus obtained has typically excellent cold flow properties and can be used as winter grade diesel fuel as is i.e. 100%, without blending it to fossil middle distillate. The renewable naphtha component formed through cracking provides a gasoline component.

Most typically, the renewable hydrocarbons produced with the present process and method are used for renewable fuels, such as gasoline, diesel or aviation fuels. The renewable hydrocarbons may be used as fuels as such, or they may be used as components of fuels or as chemicals or raw material for chemicals.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Furthermore, the described features, structures, or characteristics may be combined in any suitable manner in one or more embodiments. In the description, numerous specific details are provided to provide a thorough understanding of embodiments of the invention.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

Experimental Part

Some feedstocks were treated according to the present method, and the efficiency of the treatment with respect to phosphorus and metals was assessed.

Feeds and Procedures

Feeds used in tests included two dry rendered poultry fat samples (AFP1 and AFP2), two acid oil samples obtained from vegetable oil soapstock (ASK1 and ASK2), and five brown grease samples (BG1, BG2, BG3, BG4) of which four were centrifuged (Hettich Rotanta centrifuge, 60° C., 4300 rpm, 20 min) to lower moisture content to below 1 wt-%, denoted by "(C)".

The feeds can contain both solid (precipitate) and dissolved impurities. The solids in the feed are considered inert, and hence only the dissolved impurities are taken into account in the elementary charge determination.

The feeds were analysed for phosphorus and metals in order to determine the amount of dissolved impurities after filtration with 2 μm filter. The elementary charge Q was calculated using equation (I) based on phosphorus and metal impurity concentration of the feed, i.e. the dissolved impurities. The net elementary charge (in mmol/kg) is thus that of the feed before any treatment. The concentration of dissolved phosphorus and metals was analysed from all samples by first digesting the sample with acids in a microwave oven to obtain a clear water/acid matrix (assessed visually), then diluting it to a known amount and analysing it against the acid based calibration using ICP-MS/MS (tandem Inductively Coupled Plasma-Mass Spectrometry).

Feeds were treated by heat treatment (HT) as such, without elementary charge balancing as comparative examples, and after balancing the elementary charge by blending AFP or ASK or phosphorus containing chemicals, in which the net elementary charge of the phosphorus and metals is negative, with BG or metal containing chemicals in which the net elementary charge of the phosphorus and metals is positive, to obtain a balanced feed of elementary charge close to zero (−10 to +16.2 mmol/kg in examples).

The metal containing chemicals used were Na-stearate (Alfa Aesar), Ca-stearate (Sigma Aldrich), Fe-stearate (TCI Europe), NaOH (Emsure Merck Germany), $Ca(OH)_2$ (Sigma Aldrich), and KOH (Emsure Merck Germany) The phosphorus containing chemicals used were phosphoric acid (PA, Merck Switzerland) and soy lecithin (PL, Millipore Merck Germany). The needed dose of chemical to balance the elementary charge of the feed was calculated by equation (I) and the respective amount was added to the feed sample, mixed well and stirred for 30 min at 70° C. The feeds were left to stand overnight at 70° C. (~16-23 h) in order to achieve complete dissolution of the chemical (hydroxide/stearate/acid/lecithin) in the oil.

The heat treatment (HT) was performed by heating 600 g of the feed in a 1 L stirred autoclave reactor from Parr Instruments, under stirring of 500 rpm. The feed was heated to 280° C. (balance pressure) and kept at 280° C. for 30 min before cooling to about 60° C. In this laboratory experiment, the heating time was 30 min and the cooling time 20 min, with a reaction time of 30 min after heating and before cooling. The treatment severity corresponded roughly to 45 min treatment at 280° C. in a tube reactor setup. The heat treated product was either subjected to filtration (F) by 2 μm filter paper at 85° C. for analysis of dissolved impurities (which was carried out as above), or bleaching (BL) using 2000 mg of citric acid/kg of sample. The citric acid was added at 85° C. followed by mixing, 1 wt-% of bleaching earth was added, mixed, and the sample was dried with vacuum and filtered at 105° C. The conditions were the same in all bleaching tests. Some of the non-heat treated feeds were also subjected to bleaching as a comparison.

In all the Tables with results, the phosphorus and metals are given as dissolved phosphorus and dissolved metals, in mg/kg. The net elementary charge is the net elementary charge Q obtained by equation (I) (after converting the concentrations to mmol/kg), and is given in mmol/kg.

Results

Results for Unbalanced Feeds

The results for the unbalanced feeds, i.e. reference samples, are presented in Table 1. From the results it can be seen that AFP and ASK samples have negative elementary charge, resulting in over 10 ppm of phosphorus (P) in HT+BL product. BG samples have positive elementary charge resulting in very high amounts of metals in HT+F products and often also high amounts of metals in HT+BL products. The amount of metals is the sum of Na, Mg, K, Ca and Fe, for all the results.

TABLE 1

| | Feed | | | HT + F | | HT + BL | |
|---|---|---|---|---|---|---|---|
| | P | Metals | Net elementary charge | P | Metals | P | Metals |
| AFP1 | 430.2 | 374.3 | −29.3 | 25.1 | 5.6 | 13.5 | 1.3 |
| AFP2 | 423.9 | 246.8 | −32.9 | 73.3 | 4.1 | 26.8 | 2.5 |
| ASK1 | 148.7 | 30.8 | −13.2 | 57.7 | 5.5 | 20.5 | 1.3 |
| ASK2 | 243 | 14.5 | −22.9 | 87.6 | 2.5 | 34.1 | 0.9 |
| BG2 (C) | 38.1 | 2791.6 | 123.5 | 38.1 | 2788.8 | 0.9 | 1903.1 |
| BG1 (C) | 115.4 | 1199.3 | 46.9 | 101.2 | 1120.9 | 58.7 | 416.4 |
| BG3 (C) | 18.7 | 454.2 | 20 | 15.1 | 397.3 | 0.5 | 2.2 |
| BG4 | 37.6 | 523.3 | 22.7 | 3.4 | 453.1 | 0.3 | 6.1 |

Results for Balanced Feeds—Balancing by Feed Blending

Tables 2, 3 and 4 present the results from test series where different ASK's (negative elementary charge) were blended in different ratios with different BG's (positive elementary charge). Comparing the bleaching results of the non-heat treated feed samples (BL) with the bleaching results of the heat treated samples (HT+BL) it is clearly seen that treating the feeds with HT prior BL increases the impurity removal in bleaching.

Comparing the HT+BL results for the different feed blends of different elementary charges it is clear that the closer the elementary charge is to zero the better is the overall purification result (lower P and metals). For each mixture, one combination was the most optimal for removing both dissolved phosphorus and metals, namely the 50% ASK1+50 BG4 blend (net elementary charge 1.4 mmol/kg), 50% ASK1+50 BG3 blend (net elementary charge 1.6 mmol/kg) and 90% ASK1+10% BG2 blend (net elementary charge −1.2 mmol/kg). Also the results for the heat treated and filtered samples (HT+F) show the same trend although the impurity levels are higher than that of the bleaching products.

Figure 1:
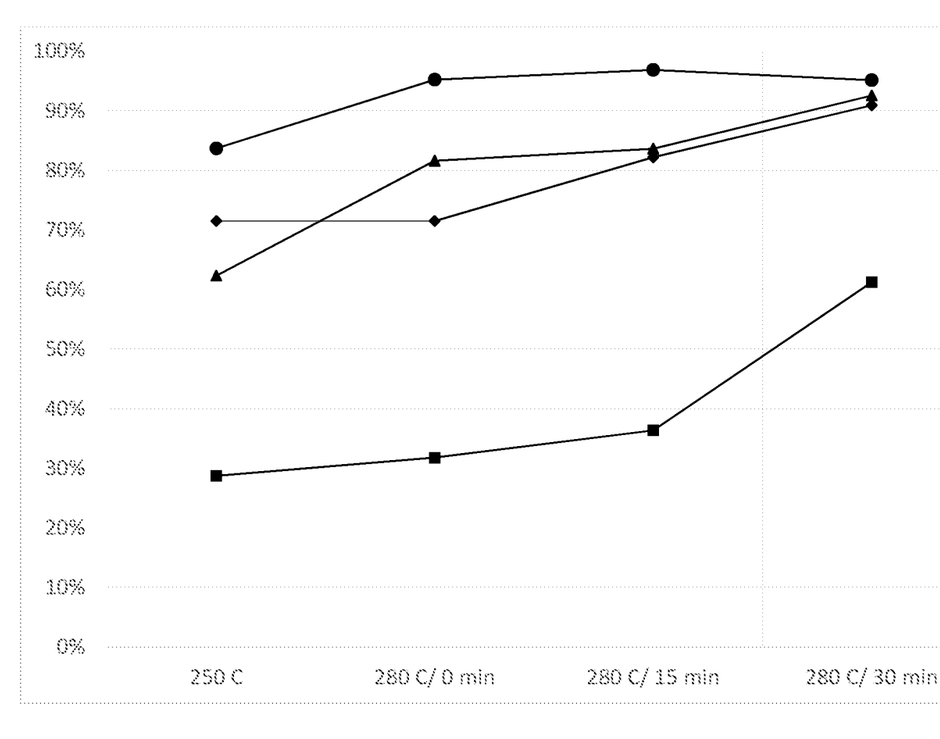
FIG. 1 illustrates efficiency of conversion of dissolved phosphorus to solid phosphorus compounds as a function of temperature and time, according to an embodiment.

FIG. 1 illustrates the conversion of dissolved phosphorus to solid phosphorus compounds (in %) for filtered intermediate samples taken during heat treatment of ASK1, BG4 and their blends. Filtration was done as above, with a 2 μm filter paper. P removal %=((dissolved P in feed)−(dissolved P in filtered HT sample))/(dissolved P in feed). "250 C" means a sample taken from the reactor when the temperature reached 250° C. (ca. 30 min from start). "280 C/0 min" stands for a sample taken when the reactor temperature reached 280° C. (ca. 45 min from start). "280 C/15 min" is a sample taken after 15 min at 280° C. (ca. 60 min from start). "280 C/30 min" stands for a sample taken after 30 min at 280° C. (ca. 75 min from start). The lowermost curve, starting at about 30% is for ASK1 alone. The second curve, starting from about 62% is for the mixture 65% ASK1 and 35% BG4. The third curve, starting at about 72% is for the BG4 alone, and the uppermost curve, starting from about 85% is for a mixture 50% ASK1 and 50% of BG4.

The results in FIG. 1 show that conversion of dissolved phosphorus (comparing dissolved P concentration in feed and product) increases with increase in treatment time. For balanced feedstock (50% ASK1+50 BG4) the conversion of dissolved P is higher than for the unbalanced feeds and very high dissolved P conversion (>95%) can be reached at lower treatment severity (lower temperature and shorter time) with the balanced feed.

TABLE 2

| | | ASK1 | ASK1:BG4 65:35 | ASK1:BG4 50:50 | BG4 |
|---|---|---|---|---|---|
| Net elementary charge | Feed | −13.2 | −3.9 | 1.4 | 22.7 |
| P | Feed | 148.7 | 116.2 | 96.6 | 37.6 |
| | HT + F | 57.7 | 8.7 | 4.7 | 3.4 |
| | HT + BL | 20.5 | 2.7 | 0.5 | 0.3 |
| | BL (ref.) | 100 | 65 | 38 | 8.3 |
| Metals | Feed | 30.8 | 153.1 | 220.5 | 527.8 |
| | HT + F | 5.5 | 7.8 | 21.7 | 453.1 |
| | HT + BL | 1.3 | 1.3 | 1.5 | 6.1 |
| | BL (ref.) | 9.3 | 17 | 18 | 17 |

TABLE 3

| | | ASK1 | ASK1:BG3 (C) 65:35 | ASK1:BG3 (C) 50:50 | BG3 (C) |
|---|---|---|---|---|---|
| Net elementary charge | Feed | −13.2 | −2.9 | 1.6 | 20 |

TABLE 3-continued

|  |  | ASK1 | ASK1:BG3 (C) 65:35 | ASK1:BG3 (C) 50:50 | BG3 (C) |
|---|---|---|---|---|---|
| P | Feed | 148.7 | 106.1 | 88.7 | 18.7 |
|  | HT + F | 57.7 | 37.3 | 4 | 15.1 |
|  | HT + BL | 20.5 | 1.6 | 0.6 | 0.5 |
| Metals | Feed | 30.8 | 154.8 | 214.8 | 454.2 |
|  | HT + F | 5.5 | 59 | 26.6 | 397.3 |
|  | HT + BL | 1.3 | 1.1 | 0.4 | 2.2 |

TABLE 4

|  |  | ASK1 | ASK1:BG2 (C) 90:10 | BG2 (C) |
|---|---|---|---|---|
| Net elementary charge | Feed | −13.2 | −1.2 | 123.5 |
| P | Feed | 148.7 | 142.3 | 38.1 |
|  | HT + F | 57.7 | 20.1 | 38.1 |
|  | HT + BL | 20.5 | 1.2 | 0.9 |
| Metals | Feed | 30.8 | 284.1 | 2791.6 |
|  | HT + F | 5.5 | 98.7 | 2788.8 |
|  | HT + BL | 1.3 | 1 | 1903.1 |

Table 5 presents the results for different elementary charge balanced feedstock blends (elementary charge −3.7 to 1.8 mmol/kg, unbalanced ASK/AFP −33 to −13 mmol/kg). The heat treated and bleached (HT+BL) products show very low phosphorus (0.5-1.7 ppm) and metals (0.4-3.7 ppm) concentration and thus a clear improvement to the result obtained by treating unbalanced feedstock separately (Table 1).

TABLE 5

|  | Feed | | Net elementary charge | HT + BL | |
|---|---|---|---|---|---|
|  | P | Metals | | P | Metals |
| 76% AFP1 + 24% BG2 (C) | 346.9 | 867.4 | 1.7 | 1.0 | 3.7 |
| 77% AFP2 + 23% BG2 (C) | 373.7 | 777.3 | −3.7 | 1.4 | 3.1 |
| 58% AFP2 + 42% BG1 (C) | 336.9 | 756.9 | 1.8 | 1.7 | 1.6 |
| 50% ASK1 + 50% BG3 (C) | 88.7 | 214.8 | 1.6 | 0.6 | 0.4 |
| 50% ASK1 + 50% BG4 | 96.6 | 220.5 | 1.4 | 0.5 | 1.5 |
| 90% ASK1 + 10% BG2 (C) | 142.3 | 284.1 | −1.2 | 1.2 | 1 |
| 40% ASK2 + 60% BG4 | 133.7 | 240.8 | −1.1 | 0.8 | 1.6 |

Results for Balanced Feeds—Balancing by Chemical Addition

Table 6 presents the results for AFP and ASK balanced with metal containing chemicals. The impurities in the HT+BL product of balanced feed is in all cases significantly lower than that after treatment of non-balanced feed.

TABLE 6

|  | Feed | | Net elementary charge | HT + BL | |
|---|---|---|---|---|---|
|  | P | Metals | | P | Metals |
| AFP2 (reference) | 423.9 | 246.8 | −32.9 | 26.8 | 2.5 |
| AFP2 + NaOH (1644 ppm) | 459.7 | 1098.4 | 0.5 | 0.9 | 2.8 |
| AFP2 + KOH (1966 ppm) | 477.0 | 1422.5 | −7.8 | 1.4 | 5.0 |
| ASK1 (reference) | 148.7 | 30.8 | −13.2 | 20.5 | 1.3 |
| ASK1 + NaOH (435 ppm) | 146.1 | 245.1 | −3.6 | 1.6 | 2.1 |
| ASK1 + Na-stearate (3334 ppm) | 151.2 | 267.7 | −3.1 | 1.8 | 0.7 |
| ASK1 + Ca-stearate (3331 ppm) | 177.7 | 274.2 | −3.9 | 2.1 | 0.4 |
| ASK1 + Fe-stearate (3245 ppm) | 158.3 | 255.4 | −2.2 | 4.4 | 0.6 |

Table 7 presents the results for BG balanced with phosphorus containing chemicals. The impurities in the HT+BL product of balanced feed is in all cases significantly lower than that after treatment of non-balanced feed. In the case of addition of phosphoric acid (PA), the net charge was calculated based on dissolved phosphorus in feed and phosphorus concentration added with PA.

TABLE 7

|  | Feed | | Net elementary charge | HT + BL | |
|---|---|---|---|---|---|
|  | P | Metals | | P | Metals |
| BG2 (C) (reference) | 38.1 | 2791.6 | 123.5 | 0.9 | 1903.1 |
| BG2 (C) + PA (3638 ppm) | 1181.1 | 2791.6 | * | 2.9 | 309.8 |
| BG2 (C) + PL (28150 ppm) | 1099.5 | 2511.7 | 6.8 | 3.2 | 440.4 |

(* PA does not dissolve, and thus the net elementary charge cannot be measured. It was calculated to be approximately +12 after addition of PA)

Thereafter, the purified feedstocks were subjected to hydrotreatment.

The invention claimed is:

1. A method for producing renewable hydrocarbons, the method comprising:
   i) providing a first feedstock comprising at least one of triglycerides and free fatty acids and dissolved impurities, wherein the dissolved impurities comprise impurities comprising phosphorus and impurities comprising at least one metal, and obtaining a net elementary charge Q1 based on phosphorus and the at least one metal of the first feedstock,
   ii) mixing the first feedstock with an elementary charge balancing component to obtain a feedstock to be purified, wherein the feedstock to be purified has a net elementary charge Qt based on phosphorus and the at least one metal within a range of from −5 to 15 mmol elementary charge/kg of the feedstock to be purified, wherein the net elementary charge Qt is different from the net elementary charge Q1;
   iii) subjecting the feedstock to be purified to heat treatment at a temperature of 180-400° C., to form precipitate compounds comprising phosphorus and the at least one metal;

iv) removing the formed precipitate compounds to obtain a purified feedstock; and
v) subjecting the purified feedstock to hydrotreatment using a catalyst sensitive to at least one of the impurities comprising phosphorous and the impurities comprising at least one metal; wherein
a net elementary charge Q based on phosphorus and the at least one metal of a feedstock is obtained by equation (I):

$$Q = (C_P \times Q_P) + \Sigma_i (c_{M_i} \times Q_{M_i}) \quad (I)$$

wherein
$C_P$ is a concentration of dissolved phosphorus in the feedstock in mmol/kg of feedstock,
$Q_P$ is an elementary charge of dissolved phosphorus in the feedstock,
$C_{Mi}$ is a concentration of dissolved metal i in the feedstock in mmol/kg of feedstock,
$Q_{Mi}$ is an elementary charge of the dissolved metal i in the feedstock, and
i is a number of dissolved metals in the feedstock,
such that for Q1, the feedstock is the first feedstock, and for Qt, the feedstock is the feedstock to be purified.

2. The method according to claim 1, wherein the elementary charge balancing component comprises a second feedstock having a net elementary charge Q2 based on phosphorus and the at least one metal, and wherein Q2 is electrically opposite to the net elementary charge Q1.

3. The method according to claim 2, wherein the second feedstock comprises at least one of animal fat, animal oil, plant fat, plant oil, fish fat, fish oil, microbial oil, waste fat, waste oil, residue fat, residue oil, and a sludge originating from plant oil production.

4. The method according to claim 3, wherein the second feedstock comprises at least one of acidulated soapstock, poultry fat, dry rendered poultry fat, brown grease, used cooking oil, tall oil, fraction of tall oil, crude tall oil, tall oil pitch, palm oil effluent sludge, crude palm oil, palm oil, palm seed oil, palm fatty acid distillate, babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil, technical corn oil, rapeseed oil, colza oil, canola oil, sunflower oil, hemp seed oil, olive oil, linseed oil, mustard oil, peanut oil, castor oil, coconut oil, lard, tallow, train oil, spent bleaching earth oil, lignocellulosic based feeds, and mixtures thereof.

5. The method according to claim 2, wherein at least one of the first feedstock and the second feedstock comprises at least one of animal fat, animal oil, plant fat, plant oil, fish fat, fish oil, microbial oil, waste fat, waste oil, residue fat, residue oil, and a sludge originating from plant oil production.

6. The method according to claim 5, wherein the second feedstock comprises at least one of acidulated soapstock, poultry fat, dry rendered poultry fat, brown grease, used cooking oil, tall oil, fraction of tall oil, crude tall oil, tall oil pitch, palm oil effluent sludge, crude palm oil, palm oil, palm seed oil, palm fatty acid distillate, babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil, technical corn oil, rapeseed oil, colza oil, canola oil, sunflower oil, hemp seed oil, olive oil, linseed oil, mustard oil, peanut oil, castor oil, coconut oil, lard, tallow, train oil, spent bleaching earth oil, lignocellulosic based feeds, and mixtures thereof.

7. The method according to claim 1, wherein the dissolved metals are dissolved metals present in an amount of at least 1 ppm by weight in the feedstock.

8. The method according to claim 1, wherein the dissolved metals comprise at least one of sodium, potassium, magnesium, calcium, iron, and mixtures thereof.

9. The method according to claim 1, wherein the elementary charge balancing component is selected from metal containing compounds capable of providing metal cations and phosphorus containing compounds capable of providing phosphorus anions.

10. The method according to claim 9, wherein the elementary charge balancing component is at least one of sodium hydroxide, sodium soap, potassium hydroxide, potassium soap, calcium hydroxide, calcium soap, magnesium hydroxide, magnesium soap, iron hydroxide, iron soap, and mixtures thereof, or at least one of phosphoric acid, a phospholipid, and mixtures thereof.

11. The method according to claim 1, wherein the heat treatment is carried out at temperature of 180-310° C.

12. The method according to claim 11, wherein the heat treatment is carried out at temperature of 200-290° C.

13. The method according to claim 1, wherein the heat treatment is carried out in the presence of water, in an amount of at most 1 wt-%.

14. The method according to claim 1, wherein the heat treatment is carried out for a period of time of 1 minute to 3 hours.

15. The method according to claim 14, wherein the heat treatment is carried out for a period of time of 15 minutes to 3 hours.

16. The method according to claim 1, wherein removing the formed precipitate compounds comprises at least one of filtration, settling, centrifugation, water washing, degumming, and bleaching.

17. The method according to claim 1, wherein the hydrotreatment comprises hydrodeoxygenation and isomerisation at a temperature in the range from 250 to 400° C., a pressure in the range from 1 to 20 MPa, and a hydrogen flow in the range from 350 to 1500 Nl $H_2$/l purified feedstock.

18. The method according to claim 1, wherein the catalyst comprises at least one of nickel, molybdenum, cobalt, tungsten, and combinations thereof.

19. The method according to claim 18, wherein the catalyst comprises one of NiMo, CoMo, NiW, and CoNiMo.

20. The method according to claim 18, wherein the catalyst comprises a support comprising at least one of alumina, silica, zeolite, and a combination thereof.

21. The method according to claim 1, wherein the catalyst comprises at least one of platinum, palladium, nickel, and combinations thereof, a zeolite selected from ZSM-12, ZSM-23, SAPO-11, SAPO-41 and fernerite, on a support of alumina and/or silica.

22. The method according to claim 1, wherein the first feedstock comprises at least one of animal fat, animal oil, plant fat, plant oil, fish fat, fish oil, microbial oil, waste fat, waste oil, residue fat, residue oil, and a sludge originating from plant oil production.

23. The method according to claim 22, wherein the first feedstock comprises at least one of acidulated soapstock, poultry fat, dry rendered poultry fat, brown grease, used cooking oil, tall oil, fraction of tall oil, crude tall oil, tall oil pitch, palm oil effluent sludge, crude palm oil, palm oil, palm seed oil, palm fatty acid distillate, babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil, technical corn oil, rapeseed oil, colza oil, canola oil, sunflower oil, hemp seed oil, olive oil, linseed oil, mustard oil, peanut oil, castor oil, coconut oil, lard, tallow, train oil, spent bleaching earth oil, lignocellulosic based feeds, and mixtures thereof.

24. The method according to claim 1, wherein the renewable hydrocarbons are renewable fuels and fuel components.

25. The method according to claim 24, wherein the renewable fuel is gasoline, diesel or aviation fuel.

26. The method according to claim 1, wherein the method is one of a batch process and a continuous process.

* * * * *